(12) United States Patent
Yamanaka et al.

(10) Patent No.: US 8,618,196 B2
(45) Date of Patent: Dec. 31, 2013

(54) FLAME RETARDANT RESIN COMPOSITION AND MOLDED ARTICLE THEREOF

(75) Inventors: Katsuhiro Yamanaka, Tokyo (JP); Toshiyuki Miyake, Tokyo (JP); Mizuho Saito, Tokyo (JP); Masami Kinoshita, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/509,655

(22) PCT Filed: Dec. 10, 2009

(86) PCT No.: PCT/JP2009/071011
§ 371 (c)(1),
(2), (4) Date: Oct. 16, 2012

(87) PCT Pub. No.: WO2011/070689
PCT Pub. Date: Jun. 16, 2011

(65) Prior Publication Data
US 2013/0030095 A1 Jan. 31, 2013

(51) Int. Cl.
*C08K 5/5357* (2006.01)
(52) U.S. Cl.
USPC .......................................... 524/120
(58) Field of Classification Search
USPC .......................................... 524/120
See application file for complete search history.

(56) References Cited

U.S. PATENT DOCUMENTS

2006/0149024 A1  7/2006  Ono et al.

FOREIGN PATENT DOCUMENTS

| GB | 1079686 A | 8/1967 |
|---|---|---|
| JP | 5-163288 A | 6/1993 |
| JP | 2004-018764 A | 1/2004 |
| JP | 2004-018765 A | 1/2004 |
| JP | 2004-018766 A | 1/2004 |
| JP | 2004-018767 A | 1/2004 |
| JP | 2004-035469 A | 2/2004 |
| JP | 2004-099550 A | 4/2004 |
| JP | 2004-131580 A | 4/2004 |
| JP | 2009-144017 A | 7/2009 |
| JP | 2009-249621 A | 10/2009 |
| JP | 2010-001362 A | 1/2010 |
| WO | 2004/111106 A1 | 12/2004 |
| WO | 2007/013463 A1 | 1/2007 |

OTHER PUBLICATIONS

Japanese Office Action dated Sep. 25, 2012 for Patent Application No. 2008-160513.

*Primary Examiner* — Peter Szekely
(74) *Attorney, Agent, or Firm* — Sughrue Mion, PLLC

(57) ABSTRACT

The present invention is a flame retardant resin composition including: 100 parts by weight of a resin component (component A) containing at least 50 wt % of a polycarbonate (component A-1) having a unit represented by the formula (A-1), and 1 to 100 parts by weight of an organic phosphorus compound (component B) represented by the formula (1):

and a molded article thereof.

16 Claims, No Drawings

FLAME RETARDANT RESIN COMPOSITION AND MOLDED ARTICLE THEREOF

CROSS REFERENCE TO RELATED APPLICATIONS

This application is a National Stage of International Application No. PCT/JP2009/071011 filed Dec. 10, 2009, the contents of which are incorporated herein by reference in their entirety.

TECHNICAL FIELD

The present invention relates to a flame retardant resin composition which is obtained from a plant-derived raw material and has high flame retardancy and excellent physical properties and to a molded article thereof. More specifically, it relates to a substantially halogen-free flame retardant resin composition which comprises a specific organic phosphorus compound and to a molded article thereof.

BACKGROUND ART

Resins such as polypropylenes (PP), acrylonitrile-butadiene-styrene (ABS), polyamides (PA6, PA66), polyesters (PET, PBT) and polycarbonates (PC) are used as raw materials for obtaining resin molded articles. These resins are produced from raw materials obtained from oil resources. In recent years, problems such as the depletion of oil resources and global environment have been concerned, and the production of a resin from a raw material obtained from biogenic matter such as a plant has been desired. Especially when a global environmental problem is taken into consideration, a resin obtained from a plant-derived raw material is regarded as a resin having a low load on the global environment from the concept "carbon neutral" which means that the balance of carbon is neutral in view of the amount of carbon dioxide absorbed during the growth of a plant even when it is burnt after use.

Meanwhile, to use a resin obtained from a plant-derived raw material as an industrial material, especially an electric/electronic-related part, OA-related part or auto part, flame retardancy must be provided to the resin from the viewpoint of safety.

Various attempts have been made for the flame retardation of resins obtained from plant-derived raw materials, especially polylactic acid resin, and a certain measure of flame retardation has been achieved. However, a large amount of a flame retardant is used to flame retard these resins, whereby the physical properties of the resins are impaired.

Meanwhile, as a resin obtained from a plant-derived raw material, a polycarbonate resin prepared from a raw material obtained from an ether diol residue which can be produced from sugar is now under study, in addition to the polylactic acid resin.

For example, an ether diol represented by the following formula (a) is easily produced from sugar or starch, and three stereoisomers of the ether diol are known.

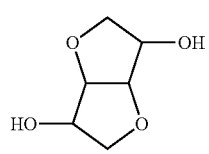

(a)

In concrete terms, the stereoisomers are 1,4:3,6-dianhydro-D-sorbitol (to be referred to as "isosorbide" hereinafter in this text) represented by the following formula (b),

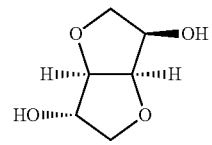

(b)

1,4:3,6-dianhydro-D-mannitol (to be referred to as "isomannide" hereinafter in this text) represented by the following formula (c),

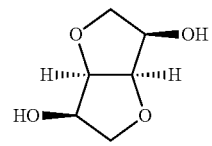

(c)

and 1,4:3,6-dianhydro-L-iditol (to be referred to as "isoidide" hereinafter in this text) represented by the following formula (d).

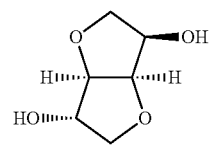

(d)

Isosorbide, isomannide and isoidide are obtained from D-glucose, D-mannose and L-idose, respectively. For example, isosorbide can be obtained by hydrogenating D-glucose and dehydrating it with an acid catalyst.

Heretofore, it has been studied to incorporate especially isosorbide among the above ether diols into a polycarbonate as the main monomer. Particularly isosorbide homopolycarbonates are disclosed by Patent Documents 1 and 2.

Patent Document 1 reports a homopolycarbonate resin having a melting point of 203° C. which is produced by a melt transesterification process. However, this polymer has unsatisfactory mechanical properties.

As an example having high heat resistance, Patent Document 2 reports a polycarbonate having a glass transition temperature of 170° C. or higher measured by differential calorimetry at a temperature elevation rate of 10° C./min. However, it has a high reduced viscosity and involves a problem that its melt viscosity is too high when it is considered as a molding material.

Meanwhile, Patent Document 3 discloses a copolycarbonate of isosorbide and a linear aliphatic diol.

The flame retardancies of the polycarbonates obtained from isosorbide are not studied at all in all of these documents.

(Patent Document 1) UK Patent Laid-opened publication No. 1079686
(Patent Document 2) WO2007/013463
(Patent Document 3) WO2004/111106

DISCLOSURE OF THE INVENTION

It is a first object of the present invention to provide a flame retardant resin composition which is obtained from a plant-derived raw material and has high flame retardancy and excellent physical properties and a molded article thereof.

It is a second object of the present invention to provide a substantially halogen-free flame retardant resin composition which comprises a specific organic phosphorus compound and a molded article thereof.

According to studies conducted by the inventors of the present invention, the above objects of the present invention are attained by a flame retardant resin composition comprising:

100 parts by weight of a resin component (component A) which contains at least 50 wt % of a polycarbonate (component A-1) having a unit represented by the following formula (A-1); and 1 to 100 parts by weight of an organic phosphorus compound (component B) represented by the following formula (1):

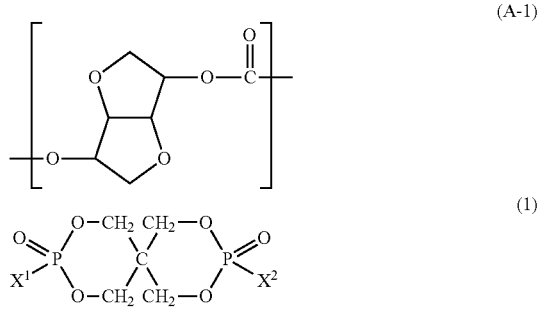

(in the above formula, $X^1$ and $X^2$ are each independently an aromatic substituted alkyl group represented by the following formula (2):

(in the above formula, AL is a branched or linear aliphatic hydrocarbon group having 1 to 5 carbon atoms, Ar is a phenyl group, naphthyl group or anthryl group, all of which may have a substituent, and may be bonded to any carbon atom contained in AL, and n is an integer of 1 to 3)).

According to the present invention, a flame retardant resin composition which is produced from a plant-derived raw material and has high flame retardancy is obtained without impairing the characteristic properties of a resin.

BEST MODE FOR CARRYING OUT THE INVENTION

The flame retardant resin composition of the present invention will be described in more detail hereinunder.
(Resin Component: Component A)

In the present invention, the resin component contains a polycarbonate (component A-1) as the main component. The content of the polycarbonate (component A-1) in the resin component is preferably at least 50 wt %, more preferably at least 60 wt %, much more preferably at least 70 wt %, particularly preferably at least 80 wt %, most preferably at least 90 wt %.

The resin component (component A) may contain another resin (component A-2). The content of the another resin (component A-2) is preferably not more than 50 wt %, more preferably not more than 40 wt %, much more preferably not more than 30 wt %, particularly preferably not more than 20 wt %, most preferably not more than 10 wt %. The another resin (component A-2) will be described in detail hereinafter.
(Polycarbonate: Component A-1)

In the present invention, the polycarbonate (component A-1) contains a carbonate unit represented by the following formula (A-1). In the all carbonate units, the content of the unit represented by the following formula (A-1) is preferably not less than 50 mol %, more preferably not less than 60 mol %, much more preferably not less than 70 mol %, particularly preferably not less than 80 mol %, most preferably not less than 90 mol %.

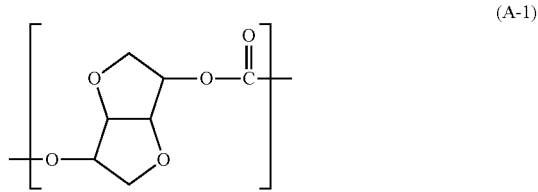

The polycarbonate (component A-1) has a biogenic matter content measured in accordance with ASTM D6866 05 of preferably not less than 25%, more preferably not less than 50%, much more preferably not less than 70%. For the quality of the present invention, the biogenic matter content is preferably higher. When the content is lower than 25%, it is hard to say that the polycarbonate is a biomass material.

The lower limit of the specific viscosity of a solution prepared by dissolving 0.7 g of the polycarbonate (component A-1) in 100 ml of methylene chloride at 20° C. is preferably 0.14 or more, more preferably 0.20 or more, much more preferably 0.22 or more. The upper limit of the specific viscosity is preferably 0.45 or less, more preferably 0.37 or less, much more preferably 0.34 or less. When the specific viscosity is lower than 0.14, it is difficult to provide sufficiently high mechanical strength to a molded article obtained from the resin composition of the present invention. When the specific viscosity is higher than 0.45, melt flowability becomes too high, and the melting temperature at which the polycarbonate has flowability required for molding becomes higher than the decomposition temperature.

The polycarbonate (component A-1) has a melt viscosity measured with a capillary rheometer at 250° C. of preferably $0.08 \times 10^3$ to $2.4 \times 10^3$ Pa·s, more preferably $0.1 \times 10^3$ to $2.0 \times 10^3$ Pa·s, much more preferably $0.1 \times 10^3$ to $1.5 \times 10^3$ Pa·s at a shear rate of 600 sec$^{-1}$. When the melt viscosity falls within this range, mechanical strength become high and a silver streak is not formed at the time of molding the resin composition of the present invention.

The lower limit of the glass transition temperature (Tg) of the polycarbonate (component A-1) is preferably 100° C. or higher, more preferably 120° C. or higher, and the upper limit thereof is preferably 165° C. or lower. When Tg is lower than 100° C., heat resistance (especially heat resistance by moisture absorption) deteriorates and when Tg is higher than 165° C., melt flowability degrades at the time of molding the resin composition of the present invention. Tg is measured with the DSC (Model DSC2910) of TA Instruments Inc.

The lower limit of the 5% weight loss temperature of the polycarbonate (component A-1) is preferably 300° C. or higher, more preferably 320° C. or higher and the upper limit thereof is preferably 400° C. or lower, more preferably 390° C. or lower, much more preferably 380° C. or lower. When the 5% weight loss temperature falls within the above range, the decomposition of the resin rarely occurs at the time of molding the resin composition of the present invention advantageously. The 5% weight loss temperature is measured with the TGA (Model TGA2950) of TA Instruments Inc.

The polycarbonate (component A-1) preferably has a glass transition temperature (Tg) of 100 to 165° C. and a 5% weight loss temperature (Td) of 300 to 400° C.

The polycarbonate (component A-1) can be produced from an ether diol represented by the following formula (a) and a diester carbonate by a melt polymerization process.

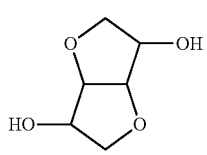

(a)

Examples of the ether diol include isosorbide, isomannide and isoidide represented by the following formulas (b), (c) and (d), respectively.

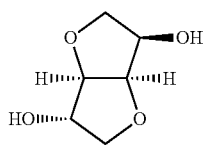

(b)

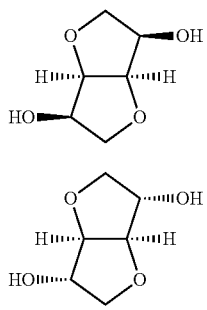

(c)

(d)

These ether diols derived from sugar are also obtained from biomass in the natural world and so-called "renewable resources". Isosorbide is obtained by hydrogenating D-glucose obtained from starch and then dehydrating it. The other ether diols are obtained through a similar reaction except for starting materials.

A polycarbonate having a carbonate unit containing a unit derived from isosorbide (1,4:3,6-dianhydro-D-sorbitol) is particularly preferred. Isosorbide is an ether diol which can be easily produced from starch, can be acquired abundantly as a resource and is superior to isomannide and isoidide in production ease, properties and application range.

The polycarbonate (component A-1) may be copolymerized with an aliphatic diol or an aromatic bisphenol as long as its characteristic properties are not impaired. The aliphatic diol is preferably a linear aliphatic diol having 3 to 12 carbon atoms or an alicyclic diol having 6 to 20 carbon atoms. Specific examples of the aliphatic diol include linear diols such as 1,3-propanediol, 1,4-butanediol and 1,6-hexanediol, and alicyclic alkylenes such as cyclohexanediol and cyclohexanedimethanol. Out of these, 1,3-propanediol, 1,4-butane-diol, 1,6-hexanediol and cyclohexanedimethanol are preferred. Since the resin composition of the present invention contains an ether diol represented by the above formula (a) as the main component and a raw material obtained from a renewable resource such as a plant, a plant-derived diol is also preferably used. Specifically, a diol containing a terpene component is used.

Examples of the aromatic bisphenol include 2,2-bis(4-hydroxyphenyl)propane (commonly called "bisphenol A"), 1,1-bis(4-hydroxyphenyl)cyclohexane, 1,1-bis(4-hydroxyphenyl)-3,3,5-trimethylcyclohexane, 4,4'-(m-phenylenediisopropylidene)diphenol, 9,9-bis(4-hydroxy-3-methylphenyl) fluorene, 2,2-bis(4-hydroxy-3-methylphenyl) propane, 2,2-bis(4-hydroxyphenyl)-4-methylpentane, 1,1-bis(4-hydroxyphenyl)decane and 1,3-bis {2-(4-hydroxyphenyl) propyl}benzene. These aliphatic diols and aromatic bisphenols may be used alone or in combination.

A terminal group may be introduced into the polycarbonate (component A-1) as long as the characteristic properties of the polycarbonate are not impaired. The terminal group can be introduced by adding a corresponding hydroxyl compound at the time of polymerization. The terminal group is preferably a terminal group represented by the following formula (i) or (ii).

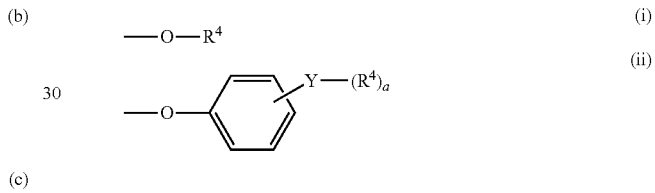

In the above formulas (i) and (ii), $R^4$ is an alkyl group having 4 to 30 carbon atoms, aralkyl group having 7 to 30 carbon atoms, perfluoroalkyl group having 4 to 30 carbon atoms or group represented by the following formula (iii). Out of these, an alkyl group having 4 to 20 carbon atoms, perfluoroalkyl group having 4 to 20 carbon atoms or group represented by the following formula (iii) is preferred. An alkyl group having 8 to 20 carbon atoms or group represented by the following formula (iii) is particularly preferred.

Y is preferably at least one bond selected from the group consisting of a single bond, ether bond, thioether bond, ester bond, amino bond and amide bond. Y is more preferably at least one bond selected from the group consisting of a single bond, ether bond and ester bond. It is particularly preferably a single bond or an ester bond. "a" is an integer of 1 to 5, preferably 1 to 3, particularly preferably 1.

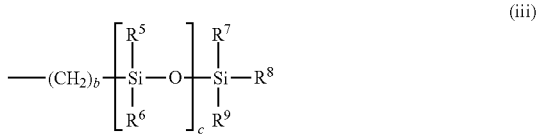

(iii)

In the above formula (iii), $R^5$, $R^6$, $R^7$, $R^8$ and $R^9$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms. Preferably, they are each independently at least one group selected from the group consisting of an alkyl group having 1 to 10 carbon atoms and aryl group having 6 to 10 carbon atoms. Particularly preferably, they are each independently at least one group selected from the group consisting of methyl group and phenyl group. "b" is an integer of 0 to 3, preferably 1 to 3, particularly preferably 2 to 3. "c" is an integer of 4 to 100, preferably 4 to 50, particularly preferably 8 to 50.

Since the polycarbonate (component A-1) has a carbonate unit obtained from a raw material obtained from a renewable resource such as a plant in the main chain structure, these hydroxy compounds are preferably raw materials obtained from renewable resources such as plants. The hydroxy compounds obtained from plants include long-chain alkyl alcohols (such as cetanol, stearyl alcohol and behenyl alcohol).

The polycarbonate (component A-1) can also be obtained by mixing together a bishydroxy compound containing an ether diol represented by the above formula (a) and a diester carbonate and carrying out melt polymerization while an alcohol or phenol formed by a transesterification reaction is distilled off at a high temperature and a reduced pressure.

The reaction temperature is preferably as low as possible in order to suppress the decomposition of the ether diol and obtain a resin which is little colored and has high viscosity. The polymerization temperature is in the range of preferably 180 to 280° C., more preferably 180 to 270° C. in order to promote the polymerization reaction properly.

Preferably, after the ether diol and the diester carbonate are heated at normal pressure to be pre-reacted with each other in the initial stage of the reaction, the pressure is gradually reduced until the pressure of the system becomes about $1.3 \times 10^{-3}$ to $1.3 \times 10^{-5}$ MPa in the latter stage of the reaction to facilitate the distillation-off of the formed alcohol or phenol. The reaction time is generally about 1 to 4 hours.

A polymerization catalyst may be used to accelerate the polymerization rate. Examples of the polymerization catalyst include alkali metal compounds such as sodium hydroxide, potassium hydroxide, sodium carbonate, potassium carbonate, sodium hydrogen carbonate, sodium salts of a diphenol and potassium salts of a diphenol. Alkali earth metal compounds such as calcium hydroxide, barium hydroxide and magnesium hydroxide may also be used. Nitrogen-containing basic compounds such as tetramethylammonium hydroxide, tetraethylammonium hydroxide, tetrabutylammonium hydroxide, trimethylamine and triethylamine may also be used. They may be used alone or in combination of two or more. Out of these, a combination of a nitrogen-containing basic compound and an alkali metal compound is preferably used.

The amount of the polymerization catalyst is preferably $1 \times 10^{-9}$ to $1 \times 10^{-3}$ equivalent, more preferably $1 \times 10^{-8}$ to $5 \times 10^{-4}$ equivalent based on 1 mole of the diester carbonate. The reaction system is preferably kept in a gas atmosphere such as nitrogen inactive to raw materials, a reaction mixture and a reaction product. Inert gases except nitrogen include argon. Additives such as an antioxidant may be further added as required.

The diester carbonate used to produce the polycarbonate (component A-1) is an ester such as an aryl group or aralkyl group having 6 to 20 carbon atoms, or alkyl group having 1 to 18 carbon atoms, all of which may be substituted. Specific examples of the diester carbonate include diphenyl carbonate, bis(chlorophenyl)carbonate, m-cresyl carbonate, dinaphthyl carbonate, bis (p-butylphenyl) carbonate, dimethyl carbonate, diethyl carbonate and dibutyl carbonate. Out of these, diphenyl carbonate is particularly preferred.

The diester carbonate is mixed with all the ether diol compounds in a molar ratio of preferably 1.02 to 0.98, more preferably 1.01 to 0.98, much more preferably 1.01 to 0.99. When the molar ratio of the diester carbonate is higher than 1.02, the ester carbonate residue serves as a terminal capping agent, whereby a sufficiently high degree of polymerization cannot be obtained disadvantageously. When the molar ratio of the diester carbonate is lower than 0.98, a sufficiently high degree of polymerization cannot be obtained as well disadvantageously.

A catalyst deactivator may also be added to the polycarbonate (component A-1) obtained by the above production method. Known catalyst deactivators are effectively used as the catalyst deactivator. Out of these, ammonium salts and phosphonium salts of sulfonic acid are preferred. The above salts of dodecylbenzenesulfonic acid such as tetrabutyl phosphonium salts of dodecylbenzenesulfonic acid and the above salts of paratoluenesulfonic acid such as tetrabutylammonium salts of paratoluenesulfonic acid are more preferred. Methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used as the sulfonic acid ester. Out of these, tetrabutylphosphonium salts of dodecylbenzenesulfonic acid are most preferably used. The amount of the catalyst deactivator is 0.5 to 50 moles, preferably 0.5 to 10 moles, more preferably 0.8 to 5 moles based on 1 mole of the polymerization catalyst selected from alkali metal compounds and/or alkali earth metal compounds.

(Another Thermoplastic Resin: Component A-2)

The resin component (component A) may contain another thermoplastic resin (component A-2) in addition to the polycarbonate (component A-1). As described above, the content of the another resin (component A-2) in the component A is preferably not more than 50 wt %, more preferably not more than 40 wt %, much more preferably not more than 30 wt %, particularly preferably not more than 20 wt %, most preferably not more than 10 wt %.

The component A-2 is at least one thermoplastic resin selected from the group consisting of polyester resin (PEst), polyphenylene ether resin (PPE), polycarbonate resin (PC), polyamide resin (PA), polyolefin resin (PO), styrene-based resin, polyphenylene sulfide resin (PPS) and polyether imide resin (PEI). Out of these components A-2, polyester resin (PEst), polyphenylene ether resin (PPE), polycarbonate resin (PC), polyamide resin (PA), polyolefin resin (PO) and styrene-based resin are preferred.

A detailed description is subsequently given of this thermoplastic resin as the component A-2.

The polyester resin (PEst) as the component A-2 is one or a mixture of two or more selected from aromatic polyester resins and aliphatic polyester resins. It is preferably an aromatic polyester resin which is a polyester comprising an aromatic dicarboxylic acid as the main dicarboxylic acid component and an aliphatic diol having 2 to 10 carbon atoms as the main glycol component. The aromatic dicarboxylic acid is contained in an amount of preferably not less than 80 mol %, more preferably not less than 90 mol % of the dicarboxylic acid component. Meanwhile, the aliphatic diol having 2 to 10 carbon atoms is contained in an amount of preferably not less than 80 mol %, more preferably not less than 90 mol % of the glycol component.

Preferred examples of the aromatic dicarboxylic acid include terephthalic acid, isophthalic acid, phthalic acid, methyl terephthalic acid, methyl isophthalic acid and 2,6-naphthalenedicarboxylic acid. They may be used alone or in combination of two or more. Other dicarboxylic acids except for the above aromatic dicarboxylic acids include aliphatic dicarboxylic acids and alicyclic dicarboxylic acids such as adipic acid, sebacic acid, decanedicarboxylic acid, azelaic acid, dodecanedicarboxylic acid and cyclohexanedicarboxylic acid.

Examples of the aliphatic diol having 2 to 10 carbon atoms include aliphatic diols such as ethylene glycol, trimethylene glycol, tetramethylene glycol, hexamethylene glycol and neopentyl glycol, and alicyclic diols such as 1,4-cyclohexane dimethanol. Other glycols except for the aliphatic diols having 2 to 10 carbon atoms include p,p'-dihydroxyethoxy bisphenol A and polyoxyethylene glycol.

A preferred example of the aromatic polyester resin is a polyester having an ester unit which comprises at least one dicarboxylic acid selected from terephthalic acid and 2,6-naphthalenedicarboxylic acid as the main dicarboxylic acid component and at least one diol selected from ethylene glycol, trimethylene glycol and tetramethylene glycol as the main diol component.

Specifically, the aromatic polyester resin is preferably at least one selected from the group consisting of polyethylene terephthalate resin, polybutylene terephthalate resin, polyethylene naphthalate resin, polybutylene naphthalate resin, polycyclohexanedimethyl terephthalate resin, polytrimethylene terephthalate resin and polytrimethylene naphthalate resin.

It is more preferably at least one selected from the group consisting of polyethylene terephthalate resin, polybutylene terephthalate resin and polyethylene naphthalate resin. It is particularly preferably polybutylene terephthalate resin.

A polyester elastomer having the above recurring unit as the main recurring unit of a hard segment may also be used as the aromatic polyester resin of the present invention.

An amorphous polyester or polycaprolactone comprising at least one dicarboxylic acid selected from terephthalic acid, isophthalic acid, sebacic acid and adipic acid as the dicarboxylic acid component and at least one diol selected from the group consisting of a long-chain diol having 5 to 10 carbon atoms and $H(OCH_2CH_2)_iOH$ (i=2 to 5) as the diol component and having a melting point of 100° C. or lower may be used as the soft segment of a polyester elastomer containing tetramethylene terephthalate or tetramethylene-2,6-naphthalene dicarboxylate as the main recurring unit of a hard segment.

The expression "main component" denotes a component which accounts for not less than 80 mol %, preferably not less than 90 mol % of the total of all the dicarboxylic acid components or all the glycol components, and the expression "main recurring unit" denotes a recurring unit which accounts for not less than 80 mol %, preferably not less than 90 mol % of the total of all the recurring units.

As for the molecular weight of the aromatic polyester resin, the aromatic polyester resin may have an intrinsic viscosity that enables a molded product thereof to be generally used, preferably 0.5 to 1.6 dl/g, more preferably 0.6 to 1.5 dl/g when measured in orthochlorophenol at 35° C.

It is advantageous that the aromatic polyester resin should have a terminal carboxyl group (—COOH) content of 1 to 60 equivalents/T (1 ton of a polymer). This terminal carboxyl group content can be obtained by measuring an m-cresol solution in accordance with a potential difference titration method using an alkali solution.

A resin which is generally known as PPE resin may be used as the polyphenylene ether resin which is the component A-2. Specific examples of PPE include homopolymers and/or copolymers such as (2,6-dimethyl-1,4-phenylene) ether, (2,6-diethyl-1,4-phenylene) ether, (2,6-dipropyl-1,4-phenylene) ether, (2-methyl-6-ethyl-1,4-phenylene) ether, (2-methyl-6-propyl-1,4-phenylene) ether and (2,3,6-trimethyl-1,4-phenylene) ether. Poly(2,6-dimethyl-1,4-phenylene) ether is particularly preferred. A graft copolymer obtained by graft polymerizing PPE with a styrene compound may also be used. The method of producing PPE is not particularly limited but PPE can be easily produced by the oxidation polymerization of 2,6-xylenol in the presence of a complex of a cuprous salt and an amine as a catalyst in accordance with the method described in U.S. Pat. No. 3,306,874.

The reduced viscosity $\eta_{sp}/C$ (0.5 g/dl, toluene solution, measured at 30° C.) which is a measure of the molecular weight of PPE resin is 0.2 to 0.7 dl/g, preferably 0.3 to 0.6 dl/g. PPE resin having a reduced viscosity within this range has good balance between moldability and mechanical properties, and the reduced viscosity can be easily controlled by adjusting the amount of the catalyst at the time of producing PPE.

The polycarbonate-based resin (PC) as the component A-2 is obtained from an interfacial polymerization reaction between a dihydroxyaryl compound and phosgene in the presence of a solvent such as methylene chloride. It is also obtained from a transesterification reaction between a dihydroxyaryl compound and diphenyl carbonate. Typical PC is a polycarbonate obtained from a reaction between 2,2'-bis(4-hydroxyphenyl) propane and phosgene.

Examples of the dihydroxyaryl compound as a raw material of the polycarbonate include bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxy-3-methylphenyl)propane, 2,2'-bis(4-hydroxy-3-tert-butylphenyl)propane, 2,2'-bis(3,5-dimethyl-4-hydroxyphenyl)propane, 2,2'-bis(4-hydroxy-3-cyclohexylphenyl)propane, 2,2'-bis(4-hydroxy-3-methoxyphenyl)propane, 1,1'-bis(4-hydroxyphenyl)cyclopentane, 1,1'-bis(4-hydroxyphenyl)cyclohexane, 1,1'-bis(4-hydroxyphenyl)cyclododecane, 4,4'-dihydroxyphenyl ether, 4,4'-dihydroxy-3,3'-dimethylphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxydiphenyl sulfone and bis(4-hydroxyphenyl)ketone. These dihydroxyaryl compounds may be used alone or in combination of two or more.

Bisphenols which form an aromatic polycarbonate having high heat resistance, bis(hydroxyphenyl)alkanes such as 2,2'-bis(4-hydroxyphenyl)propane, bis(hydroxyphenyl)cycloalkanes such as bis(4-hydroxyphenyl)cyclohexane, dihydroxydiphenyl sulfide, dihydroxydiphenyl sulfone and dihydroxydiphenyl ketone are preferred dihydroxyaryl compounds. 2,2'-bis(4-hydroxyphenyl)propane which forms a bisphenol A type aromatic polycarbonate is a particularly preferred dihydroxyaryl compound.

Part of bisphenol A may be substituted by another dihydroxyaryl compound to produce a bisphenol A type aromatic polycarbonate as long as heat resistance and mechanical properties are not impaired.

The molecular weight of the polycarbonate does not need to be particularly limited but if it is too low, strength becomes unsatisfactory and if it is too high, melt viscosity becomes high, thereby making molding difficult. The molecular weight of the polycarbonate is generally 10,000 to 50,000, preferably 15,000 to 30,000 in terms of viscosity average molecular weight. The viscosity average molecular weight (M) is obtained by inserting the specific viscosity ($\eta_{sp}$) of a solution prepared by dissolving 0.7 g of the polycarbonate in 100 ml of methylene chloride at 20° C. into the following equation.

$$\eta_{sp}/C=[\eta]+0.45\times[\eta]^2 C$$

$$[\eta]=1.23\times10^{-4} M^{0.83}$$

($[\eta]$ is an intrinsic viscosity and C is 0.7 as the concentration of the polymer.)

A brief description is given of the basic means for producing the polycarbonate. In the interfacial polymerization process (solution polymerization process) in which phosgene is used as a carbonate precursor, a reaction is generally carried out in the presence of an acid binder and an organic solvent. Examples of the acid binder include alkali metal hydroxides such as sodium hydroxide and potassium hydroxide and amine compounds such as pyridine. Examples of the organic solvent include halogenated hydrocarbons such as methylene chloride and chlorobenzene. A catalyst such as tertiary amine or quaternary amine may be used to promote the reaction. A terminal capping agent such as phenol or alkyl-substituted phenol as exemplified by p-tert-butylphenol is desirably used as a molecular weight control agent. The reaction temperature is generally 0 to 40° C., the reaction time is several minutes to 5 hours, and pH during the reaction is preferably kept at 10 or more. All the terminals of the obtained molecular chain do not need to have a structure derived from the terminal capping agent.

In the transesterification reaction (melt polymerization process) in which a diester carbonate is used as the carbonate precursor, a predetermined amount of a diphenol is stirred together with the diester carbonate in the presence of an inert gas under heating, and the formed alcohol or phenol is distilled off. The reaction temperature which differs according to the boiling point of the formed alcohol or phenol is generally 120 to 350° C. The reaction is completed while the formed alcohol or phenol is distilled off by reducing the pressure from the initial stage. In the initial stage of the reaction, a terminal capping agent is added at the same time as the diphenol or in the middle of the reaction. An existing known catalyst which is used for a transesterification reaction may be used to promote the reaction. Examples of the diester carbonate used in this transesterification reaction include diphenyl carbonate, dinaphthyl carbonate, dimethyl carbonate, diethyl carbonate and dibutyl carbonate. Out of these, diphenyl carbonate is particularly preferred.

The polyamide resin (PA) as the component A-2 is, for example, a ring-opened polymer of a cyclic lactam, a polymer of an aminocarboxylic acid or a polycondensate of a dibasic acid and a diamine. Specific examples of the polyamide resin include aliphatic polyamides such as nylon 6, nylon 66, nylon 46, nylon 610, nylon 612, nylon 11 and nylon 12, and copolymers and mixtures thereof. Aliphatic-aromatic polyamides such as poly(metaxyleneadipamide), poly(hexamethyleneterephthalamide), poly(nonamethyleneterephthalamide), poly(hexamethyleneisophthalamide) and poly(tetramethyleneisophthalamide), and copolymers and mixtures thereof may also be used. The polyamide which can be used in the present invention is not particularly limited.

As for the molecular weight of the polyamide resin, the relative viscosity measured in 98% sulfuric acid at a concentration of 1% and 25° C. is preferably 1.7 to 4.5, more preferably 2.0 to 4.0, much more preferably 2.0 to 3.5.

The polyolefin resin as the component A-2 is, for example, a homopolymer or copolymer of an olefin such as ethylene, propylene or butene, or a copolymer of an olefin and a comonomer copolymerizable with the olefin. Specific examples of the polyolefin resin include polyethylene, polypropylene, ethylene-vinyl acetate copolymer, ethylene-ethyl acrylate copolymer, ethylene-acrylic acid copolymer, ethylene-methyl methacrylate copolymer, ethylene-α-olefin copolymer, ethylene-propylene copolymer and ethylene-butene copolymer. The molecular weight of the polyolefin resin is not particularly limited but as it becomes higher, flame retardancy becomes better.

The styrene-based resin as the component A-2 is a homopolymer or copolymer of an aromatic vinyl monomer such as styrene, α-methylstyrene or vinyl toluene, a copolymer of one of these monomers and a vinyl monomer such as acrylonitrile or methyl methacrylate, or a graft polymer obtained by graft polymerizing a diene-based rubber such as polybutadiene, ethylene-propylene-based rubber or acrylic rubber with styrene and/or a styrene derivative, or styrene and/or a styrene derivative with another vinyl monomer.

Examples of the styrene-based resin include polystyrene, impact-resistant polystyrene (HIPS), acrylonitrile•styrene copolymer (AS resin), acrylonitrile-butadiene-styrene copolymer (ABS resin), methyl methacrylate•butadiene•styrene copolymer (MBS resin), methyl methacrylate•acrylonitrile•butadiene•styrene copolymer (MABS resin), acrylonitrile-acrylic rubber-styrene copolymer (AAS resin), acrylonitrile•ethylene propylene-based rubber•styrene copolymer (AES resin), and mixtures thereof.

From the viewpoint of impact resistance, rubber modified styrene-based resins are preferred, and they are polymers containing rubber-like polymer particles dispersed in a vinyl aromatic polymer matrix and obtained by adding an aromatic vinyl monomer and optionally a vinyl monomer in the presence of a rubber-like polymer and carrying out the known bulk polymerization, bulk suspension polymerization, solution polymerization or emulsion polymerization of the resulting monomer mixture.

Examples of the above rubber-like polymer include diene-based rubbers such as polybutadiene, poly(styrene-butadiene) and poly(acrylonitrile-butadiene), saturated rubbers obtained by hydrogenating the above diene rubbers, acrylic rubbers such as isoprene rubber, chloroprene rubber and butyl polyacrylate, and ethylene-propylene-diene monomer terpolymer (EPDM). Out of these, diene-based rubbers are preferred.

The aromatic vinyl monomer which is an essential component contained in the monomer mixture which is graft copolymerizable and polymerized in the presence of the above rubber-like polymer is, for example, styrene, α-methylstyrene or paramethyl styrene, out of which styrene is most preferred.

Examples of the vinyl monomer which can be optionally added include acrylonitrile and methyl methacrylate.

The content of the rubber-like polymer in the rubber modified styrene resin is 1 to 50 wt %, preferably 2 to 40 wt %. The content of the graft polymerizable monomer mixture is 99 to 50 wt %, preferably 98 to 60 wt %.

The polyphenylene sulfide resin (PPS) as the component A-2 has a recurring unit represented by the following formula.

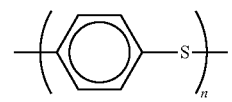

In the above formula, "n" is an integer of 1 or more, preferably 50 to 500, more preferably 100 to 400, and the polyphenylene sulfide resin may be either linear or crosslinked.

As an example of the method of producing the polyphenylene sulfide resin, dichlorobenzene and sodium disulfide are reacted with each other. A crosslinked polyphenylene sulfide resin can be produced by polymerizing a polymer having a low degree of polymerization, heating it in the presence of air and partially crosslinking it to increase its molecular weight, and a linear polyphenylene sulfide resin can be produced by increasing the molecular weight at the time of polymerization.

The polyether imide resin (PEI) as the component A-2 has a recurring unit represented by the following formula.

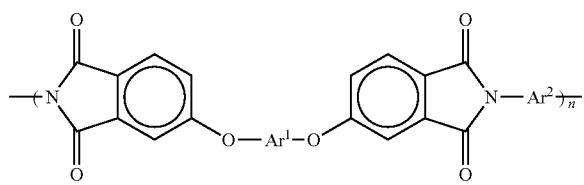

In the above formula, $Ar^1$ is an aromatic dihydroxy compound residue, and $Ar^2$ is an aromatic diamine residue. Examples of the aromatic dihydroxy compound include aromatic dihydroxy compounds which have been listed for the explanation of the above polycarbonate resin, particularly preferably bisphenol A. Examples of the aromatic diamine include m-phenylenediamine, p-phenylenediamine, 4,4'-diaminodiphenyl, 3,4'-diaminodiphenyl, 4,4'-diaminodiphenyl ether, 3,4'-diaminodiphenyl ether, diaminodiphenyl methane, diaminodiphenyl sulfone and diaminodiphenyl sulfide.

"n" in the above formula is an integer of 5 to 1,000, preferably 10 to 500.

Examples of the method of producing the polyether imide resin are described in U.S. Pat. No. 3,847,867, U.S. Pat. No. 3,847,869, U.S. Pat. No. 3,850,885, U.S. Pat. No. 3,852,242 and U.S. Pat. No. 3,855,178.

Out of the above-described components A-2, the polyester resin (PEst), the polyphenylene ether resin (PPE), the polycarbonate resin (PC), the polyamide resin (PA) and the styrene-based resin are preferred.

(Organic Phosphorus Compound: Component B)

In the present invention, the organic phosphorus compound used as the component B is represented by the following formula (1).

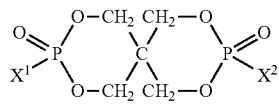
(1)

In the above formula (1), $X^1$ and $X^2$ are each independently an aromatic substituted alkyl group represented by the following formula (2).

(2)

In the above formula (2), AL is a branched or linear aliphatic hydrocarbon group having 1 to 5 carbon atoms. The aliphatic hydrocarbon group is preferably an alkanediyl group, alkanetriyl group or alkanetetrayl group. Ar is a phenyl group, naphthyl group or anthryl group, all of which may have a substituent. Ar may be bonded to any carbon atom contained in AL. "n" is an integer of 1 to 3.

The component B is one or a mixture of two or more selected from organic phosphorus compounds represented by the following formulas (3) and (4).

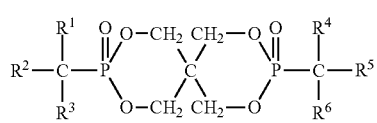
(3)

In the above formula, $R^2$ and $R^5$ are each independently a phenyl group, naphthyl group or anthryl group, all of which may have a substituent. Examples of the substituent include alkyl groups having 1 to 6 carbon atoms such as methyl group, ethyl group, propyl group and butyl group, halogen atoms such as fluorine atom, chlorine atom and bromine atom, and aryl groups having 6 to 12 carbon atoms such as phenyl group and naphthyl group.

$R^1$, $R^3$, $R^4$ and $R^6$ are each independently a hydrogen atom, branched or linear alkyl group having 1 to 4 carbon atoms, phenyl group which may have a substituent, naphthyl group which may have a substituent or anthryl group which may have a substituent. Examples of the alkyl group include methyl group, ethyl group, propyl group and butyl group. Examples of the substituent include alkyl groups having 1 to 6 carbon atoms such as methyl group, ethyl group, propyl group and butyl group, halogen atoms such as fluorine atom, chlorine atom and bromine atom, and aryl groups having 6 to 12 carbon atoms such as phenyl group and naphthyl group.

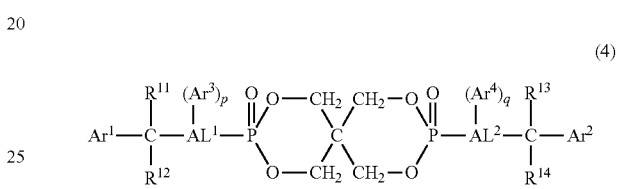
(4)

In the above formula, $Ar^1$ and $Ar^2$ are each independently a phenyl group, naphthyl group or anthryl group, all of which may have a substituent. Examples of the substituent include alkyl groups having 1 to 6 carbon atoms such as methyl group, ethyl group, propyl group and butyl group, halogen atoms such as fluorine atom, chlorine atom and bromine atom, and aryl groups having 6 to 12 carbon atoms such as phenyl group and naphthyl group.

$R^{11}$, $R^{12}$, $R^{13}$ and $R^{14}$ are each independently a hydrogen atom, aliphatic hydrocarbon group having 1 to 3 carbon atoms, phenyl group which may have a substituent, naphthyl group which may have a substituent or anthryl group which may have a substituent. Examples of the substituent include alkyl groups having 1 to 6 carbon atoms such as methyl group, ethyl group, propyl group and butyl group, halogen atoms such as fluorine atom, chlorine atom and bromine atom, and aryl groups having 6 to 12 carbon atoms such as phenyl group and naphthyl group.

$AL^1$ and $AL^2$ are each independently a branched or linear aliphatic hydrocarbon group having 1 to 4 carbon atoms. Examples of the aliphatic hydrocarbon group include alkanediyl groups having 1 to 4 carbon atoms such as methylene group, ethylene group and propyl group, alkanetriyl groups having 1 to 4 carbon atoms such as methanetriyl group, ethanetriyl group and propanetriyl group, and alkanetetrayl groups having 1 to 4 carbon atoms such as methanetetrayl group, ethanetetrayl group and propanetetrayl group.

$Ar^3$ and $Ar^4$ are each independently a phenyl group, naphthyl group or anthryl group, all of which may have a substituent. Examples of the substituent include alkyl groups having 1 to 6 carbon atoms such as methyl group, ethyl group, propyl group and butyl group, halogen atoms such as fluorine atom, chlorine atom and bromine atom, and aryl groups having 6 to 12 carbon atoms such as phenyl group and naphthyl group.

"p" and "q" are each independently an integer of 0 to 3. $Ar^3$ and $Ar^4$ may be bonded to any carbon atoms of $AL^1$ and $AL^2$, respectively.

Further, the organic phosphorus compound is more preferably any one of phosphorus-based compounds represented by the following formulas (5), (6), (7) and (8).

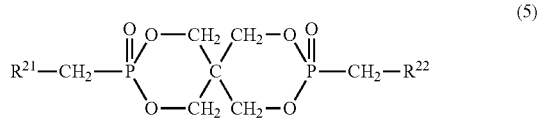
(5)

In the above formula, $R^{21}$ and $R^{22}$ are each independently a phenyl group, naphthyl group or anthryl group, all of which may have a substituent. Out of these, they are preferably phenyl groups. The hydrogen atom of the aromatic ring of the phenyl group, naphthyl group or anthryl group represented by $R^{21}$ and $R^{22}$ may be substituted, and the substituent is methyl, ethyl, propyl, butyl or aryl group having 6 to 14 carbon atoms and bonded to the aromatic ring through an oxygen atom, sulfur atom or aliphatic hydrocarbon group having 1 to 4 carbon atoms.

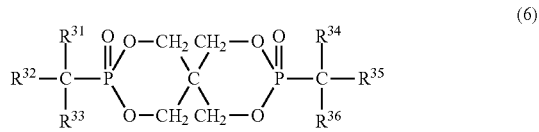
(6)

In the formula (6), $R^{31}$ and $R^{34}$ are each independently a hydrogen atom or aliphatic hydrocarbon group having 1 to 4 carbon atoms. $R^{31}$ and $R^{34}$ are each preferably a hydrogen atom, methyl group or ethyl group, particularly preferably a hydrogen atom. $R^{33}$ and $R^{36}$ are each independently an aliphatic hydrocarbon group having 1 to 4 carbon atoms, preferably methyl group or ethyl group. $R^{32}$ and $R^{35}$ are each independently a phenyl group, naphthyl group or anthryl group, all of which may have a substituent. They are preferably phenyl groups and may have a substituent in any part except for the part bonded to phosphorus through a carbon atom on the aromatic ring. The substituent is methyl, ethyl, propyl (including an isomer thereof), butyl (including an isomer thereof) or aryl group having 6 to 14 carbon atoms and bonded to the aromatic ring through oxygen, sulfur or aliphatic hydrocarbon group having 1 to 4 carbon atoms.

In the formula (6), preferred examples of $R^{32}$ and $R^{35}$ include phenyl group, cresyl group, xylyl group, trimethylphenyl group, 4-phenoxyphenyl group, cumyl group, naphthyl group and 4-benzylphenyl group, out of which phenyl group is particularly preferred.

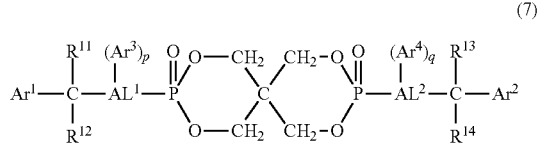
(7)

In the above formula (7), $Ar^1$ and $Ar^2$ are each independently a phenyl group, naphthyl group or anthryl group, all of which may have a substituent. $R^{11}$, $R^{12}$, $R^{13}$ and $R^{14}$ are each independently a hydrogen atom, aliphatic hydrocarbon group having 1 to 3 carbon atoms, phenyl group which may have a substituent, naphthyl group which may have a substituent or anthryl group which may have a substituent. They are preferably phenyl groups and may have a substituent in any part except for the part bonded to phosphorus through a carbon atom on the aromatic ring. The substituent is methyl, ethyl, propyl (including an isomer thereof), butyl (including an isomer thereof) or aryl group having 6 to 14 carbon atoms and bonded to the aromatic ring through oxygen, sulfur or aliphatic hydrocarbon group having 1 to 4 carbon atoms.

Preferred examples of $Ar^1$ and $Ar^2$ in the above formula (7) include phenyl group, cresyl group, xylyl group, trimethylphenyl group, 4-phenoxyphenyl group, cumyl group, naphthyl group and 4-benzylphenyl group. They are particularly preferably phenyl groups.

In the formula (7), $AL^1$ and $AL^2$ are each independently a branched or linear aliphatic hydrocarbon group having 1 to 4 carbon atoms. They are each preferably a branched or linear aliphatic hydrocarbon group having 1 to 3 carbon atoms, particularly preferably a branched or linear aliphatic hydrocarbon group having 1 to 2 carbon atoms. Examples of the aliphatic hydrocarbon group include alkanediyl groups having 1 to 4 carbon atoms such as methylene group, ethylene group and propyl group, alkanetriyl groups having 1 to 4 carbon atoms such as methanetriyl group, ethanetriyl group and propanetriyl group, and alkanetetrayl groups having 1 to 4 carbon atoms such as methanetetrayl group, ethanetetrayl group and propanetetrayl group.

In the above formula (7), preferred examples of $AL^1$ and $AL^2$ include methylene group, ethylene group, ethylidene group, trimethylene group, propylidene group and isopropylidene group, out of which methylene group, ethylene group and ethylidene group are particularly preferred.

In the formula (7), $Ar^3$ and $Ar^4$ are each independently a phenyl group, naphthyl group or anthryl group, all of which may have a substituent. They are preferably phenyl groups and may have a substituent in any part except for the part bonded to phosphorus through a carbon atom on the aromatic ring. The substituent is methyl, ethyl, propyl (including an isomer thereof), butyl (including an isomer thereof) or aryl group having 6 to 14 carbon atoms and bonded to the aromatic ring through oxygen, sulfur or aliphatic hydrocarbon group having 1 to 4 carbon atoms. $Ar^3$ and $Ar^4$ may be bonded to any carbon atoms of $AL^1$ and $AL^2$, respectively.

In the formula (7), "p" and "q" are each independently an integer of 0 to 3, preferably 0 or 1, particularly preferably 0.

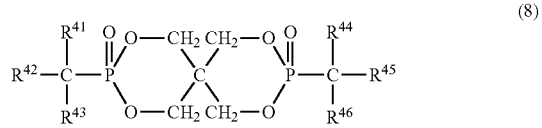
(8)

In the above formula (8), $R^{41}$ and $R^{44}$ are each independently a hydrogen atom, aliphatic hydrocarbon group having 1 to 4 carbon atoms, phenyl group which may have a substituent, naphthyl group which may have a substituent or anthryl group which may have a substituent. $R^{41}$ and $R^{44}$ are each preferably a hydrogen atom, aliphatic hydrocarbon group having 1 to 3 carbon atoms or phenyl group which may have a substituent. When $R^{41}$ and $R^{44}$ are phenyl groups, they may have a substituent in any part except for the part bonded to phosphorus through a carbon atom on the aromatic ring. The substituent is methyl, ethyl, propyl (including an isomer thereof), butyl (including an isomer thereof) or aryl group having 6 to 14 carbon atoms and bonded to the aromatic ring through oxygen, sulfur or aliphatic hydrocarbon group having 1 to 4 carbon atoms.

In the formula (8), preferred examples of $R^{41}$ and $R^{44}$ include hydrogen atom, methyl group, ethyl group, propyl group (including an isomer thereof), phenyl group, cresyl group, xylyl group, trimethylphenyl group, 4-phenoxyphenyl group, cumyl group, naphthyl group and 4-benzylphenyl group, out of which hydrogen atom, methyl group and phenyl group are particularly preferred.

$R^{42}$, $R^{43}$, $R^{45}$ and $R^{46}$ are each independently a phenyl group, naphthyl group or anthryl group, all of which may have a substituent. They are preferably phenyl groups and may have a substituent in any part except for the part bonded to phosphorus through a carbon atom on the aromatic ring. The substituent is methyl, ethyl, propyl (including an isomer thereof), butyl (including an isomer thereof) or aryl group having 6 to 14 carbon atoms and bonded to the aromatic ring through oxygen, sulfur or aliphatic hydrocarbon group having 1 to 4 carbon atoms.

In the above formula (8), preferred examples of $R^{42}$, $R^{43}$, $R^{45}$ and $R^{46}$ include phenyl group, cresyl group, xylyl group, trimethylphenyl group, 4-phenoxyphenyl group, cumyl group, naphthyl group and 4-benzylphenyl group. They are particularly preferably phenyl groups.

The organic phosphorus compound (component B) represented by the above formula (1) has an extremely excellent flame retarding effect for the resin. As far as the inventors of the present invention know, the conventional halogen-free flame retardation of the resin has been difficult with a small amount of a flame retardant and has had a large number of problems to be solved for practical use.

However, according to the present invention, surprisingly, the flame retardation of the resin is easily attained by using a small amount of the above organic phosphorus compound (component B) alone without impairing the characteristic properties of the resin.

In the present invention, a phosphorus compound except for the component B, a fluorine-containing resin or other additives may be used as a matter of course in addition to the component B in order to reduce the amount of the component B and improve the flame retardancy, physical properties and chemical properties of a molded article and for other purposes. These other components will be described in detail hereinafter.

Although the organic phosphorus compound (component B) as a flame retardant in the resin composition of the present invention is represented by the formula (1), the most preferred typical compound is a compound represented by the following formula (1-a), (1-b), (1-c) or (1-d).

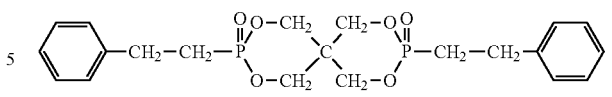

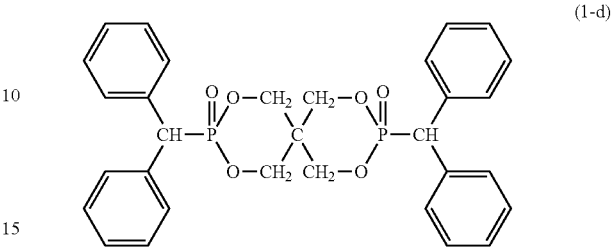

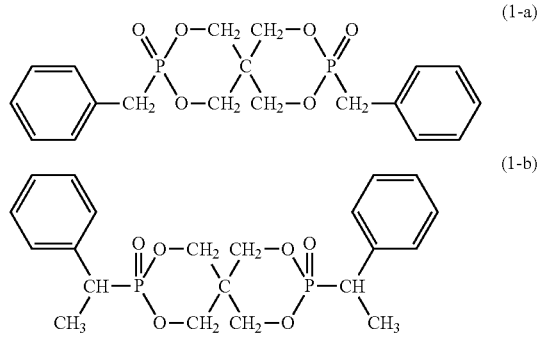

A description is subsequently given of the method of synthesizing the above organic phosphorus compound (component B) in the present invention. The component B may be produced by a method except for the method described below.

The component B is obtained by reacting phosphorus trichloride with pentaerythritol, treating the oxidized reaction product with an alkali metal compound such as sodium methoxide and reacting an aralkyl halide with the reaction product.

The component B may also be obtained by a method in which pentaerythritol is reacted with aralkyl phosphonic acid dichloride, or a method in which pentaerythritol is reacted with phosphorus trichloride and then the obtained compound is reacted with an aralkyl alcohol to carry out Arbuzov rearrangement at a high temperature. The latter reaction is disclosed in U.S. Pat. No. 3,141,032, JP-A 54-157156 and JP-A 53-39698.

Specific methods of synthesizing the component B will be described hereinbelow, and these methods are just given for explanation. The component B used in the present invention may be synthesized not only by these methods but also by modified methods thereof and other methods. More specific synthesizing methods will be described in Preparation Examples which are given hereinafter.

(I) Organic Phosphorus Compound (1-a) in Component B;
This compound can be obtained by reacting pentaerythritol with phosphorus trichloride, treating the reaction product oxidized by tertiary butanol with sodium methoxide and reacting the reaction product with benzyl bromide.

(II) Organic Phosphorus Compound (1-b) in Component B;
This compound can be obtained by reacting pentaerythritol with phosphorus trichloride, treating the reaction product oxidized by tertiary butanol with sodium methoxide and reacting the reaction product with 1-phenylethyl bromide.

(III) Organic Phosphorus Compound (1-c) in Component B;
This compound can be obtained by reacting pentaerythritol with phosphorus trichloride, treating the reaction product oxidized by tertiary butanol with sodium methoxide and reacting the reaction product with 2-phenylethyl bromide.

(IV) Organic Phosphorus Compound (1-d) in Component B;
This compound can be obtained by reacting pentaerythritol with diphenylmethyl phosphonic acid dichloride.

As an alternative method, the organic phosphorus compound is obtained by reacting pentaerythritol with phosphorus trichloride and heating a reaction product of the obtained product and diphenyl methyl alcohol in the presence of a catalyst.

The acid value of the above-described component B is preferably not more than 0.7 mgKOH/g, more preferably not more than 0.5 mgKOH/g. By using the component B having an acid value within this range, a molded article which is excellent in flame retardancy and color and has high heat stability is obtained. The acid value of the component B is most preferably not more than 0.4 mgKOH/g. The term "acid value" means the amount of KOH required for neutralizing the acid component contained in 1 g of a sample (component B).

Further, the component B having an HPLC purity of preferably at least 90%, more preferably at least 95% is used. The component B having such a high HPLC purity is excellent in the flame retardancy, color and heat stability of a molded article obtained therefrom. The HPLC purity of the component B can be effectively measured by the following method.

The Develosil ODS-7 having a length of 300 mm and a diameter of 4 mm of Nomura Kagaku Co., Ltd. was used as a column, and the column temperature was set to 40° C. A mixed solution of acetonitrile and water in a volume ratio of 6:4 was used as a solvent, and 5 μl of the solution was injected. An UV-260 nm detector was used.

The method of removing impurities contained in the component B is not particularly limited but a method in which repulp washing (washing with a solvent and filtration are repeated several times) is carried out with a solvent such as water or methanol is the most effective and economically advantageous.

The content of the component B is 1 to 100 parts by weight, preferably 2 to 90 parts by weight, more preferably 2 to 70 parts, much more preferably 3 to 50 parts by weight based on 100 parts by weight of the resin component (component A). The preferred range of the content of the component B is determined according to the desired level of flame retardancy and the type of the resin component (component A). Other components except for the components A and B constituting the composition may be optionally used as long as the object of the present invention is not impaired, and the content of the component B can be changed by using another flame retardant, a retarding aid or a fluorine-containing resin. In most cases, the content of the component B can be reduced by using these substances.

The flame retardant resin composition of the present invention can achieve at least UL-94 V-2 flame retardancy.
(Preparation of Flame Retardant Resin Composition)

The flame retardant resin composition of the present invention can be prepared by pre-mixing together the resin component (component A), the organic phosphorus compound (component B) and optionally other components by means of a mixer such as a twin-cylinder mixer, super mixer, super floater or Henschel mixer and melt mixing the resulting mixture by means of a kneader.

A melt mixer such as a kneader, or single-screw or double-screw extruder may be used as the kneader. A method in which a double-screw extruder is used to melt the resin composition at 220 to 280° C., preferably 230 to 270° C. and a liquid component is injected into the resin composition by a side feeder, extruded and pelletized by a pelletizer is particularly preferably employed.
(Application)

The flame retardant resin composition of the present invention contains substantially no halogen, has extremely high flame retardancy and is useful as a material for forming various molded articles such as home electric appliance parts, electric and electronic parts, auto parts, mechanical and electromechanical parts, and cosmetic containers. More specifically, it can be advantageously used in breaker parts, switch parts, motor parts, ignition coil cases, power plugs, power receptacles, coil bobbins, connectors, relay cases, fuse cases, flyback transformer parts, focus block parts, distributor caps and harness connectors. Further, it is useful for housings, casings and chassis which are becoming thinner, for example, housings, casings and chassis for electric and electronic products (for example, home electric appliances and OA equipment such as telephones, personal computers, printers, facsimiles, copiers, TV, video decks and audio equipment, and parts thereof). It is particularly useful for mechanical and electromechanical parts for home electric appliances and OA equipment, such as printer housings, fixing unit parts and facsimiles all of which require excellent heat resistance and flame retardancy.

The molding technique is not particularly limited and may be injection molding, blow molding or press molding. However, preferably, a pellet resin composition is injection molded by using an injection molding machine.

EXAMPLES

The following examples are provided for the purpose of further illustrating the present invention but are in no way to be taken as limiting. Evaluations were made by the following methods.
(1) Flame Retardancy (UL-94 Rating)

Flame retardancy was rated by using a test piece having a thickness of 1/16 inch (1.6 mm) in accordance with a vertical burn test specified in US UL-94 standards as a measure of evaluating flame retardancy. When burning stops within 10 seconds after a flame is removed and cotton is not ignited, flame retardancy is V-0, and when burning stops within 30 seconds after a flame is removed, flame retardancy is V-2.

A specimen rated below this is designated as "notV".
(2) Acid Value

This was measured in accordance with JIS-K-3504.

Preparation Example 1

Preparation of 2,4,8,10-tetraoxa-3,9-diphosphaspiro [5.5]undecane, 3,9-dibenzyl-3,9-dioxide (FR-1)

816.9 g (6.0 moles) of pentaerythritol, 19.0 g (0.24 mole) of pyridine and 2,250.4 g (24.4 moles) of toluene were fed to a reactor equipped with a thermometer, condenser and dropping funnel and stirred. 1,651.8 g (12.0 moles) of phosphorus trichloride was added to the reactor by using the dropping funnel and then heated and stirred at 60° C. after addition. After a reaction, the reactor was cooled to room temperature, 26.50 parts of methylene chloride was added to the obtained reaction product, and 889.4 g (12.0 moles) of tertiary butanol and 150.2 g (1.77 moles) of methylene chloride were added dropwise under cooling with ice. The obtained crystal was washed with toluene and methylene chloride and filtered. The obtained filtrate was dried at 80° C. and $1.33 \times 10^2$ Pa for 12 hours to obtain 1,341.1 g (5.88 moles) of a white solid. It was confirmed by $^{31}P$ and $^{1}H$-NMR spectra that the obtained solid was 2,4,8,10-tetraoxa-3,9-diphosphaspiro[5.5]undecane, 3,9-dihydro-3,9-dioxide.

1,341.0 g (5.88 moles) of the obtained 2,4,8,10-tetraoxa-3,9-diphosphaspiro[5.5]undecane, 3,9-dihydro-3,9-dioxide and 6,534.2 g (89.39 moles) of DMF were fed to a reactor equipped with a thermometer, condenser and dropping funnel and stirred. 648.7 g (12.01 moles) of sodium methoxide was added to the reactor under cooling with ice. After 2 hours of stirring under cooling with ice, they were stirred at room temperature for 5 hours. Further, after DMF was distilled off, 2,613.7 g (35.76 moles) of DMF was added, and 2,037.79 g (11.91 moles) of benzyl bromide was added dropwise to the reaction mixture under cooling with ice. After 3 hours of stirring under cooling with ice, DMF was distilled off, 8 liters of water was added, and the precipitated solid was separated by filtration and washed with 2 liters of water twice. The obtained roughly purified product and 4 liters of methanol were put into a reactor equipped with a condenser and stirrer and refluxed for about 2 hours. After the reactor was cooled to room temperature, the crystal was separated by filtration and washed with 2 liters of methanol, and the obtained filtrate was dried at 120° C. and $1.33 \times 10^2$ Pa for 19 hours to obtain 1,863.5 g (4.56 moles) of a white flaky crystal. It was confirmed by $^{31}$P and $^1$H-NMR spectra and elemental analysis that the obtained crystal was 2,4,8,10-tetraoxa-3,9-diphosphaspiro[5.5]undecane, 3,9-dibenzyl-3,9-dioxide. The yield rate was 76%, and the $^{31}$P-NMR purity was 99%. The HPLC purity measured by the method of this text was 99%. The acid value was 0.06 mgKOH/g. $^1$H-NMR (DMSO-$d_6$, 300 MHz): δ7.2-7.4 (m, 10H), 4.1-4.5 (m, 8H), 3.5 (d, 4H), $^{31}$P-NMR (DMSO-$d_6$, 120 MHz): δ23.1 (S), melting point: 255-256° C., elemental analysis calculated values: C, 55.89; H, 5.43, measurement values: C, 56.24; H, 5.35

Preparation Example 2

Preparation of 2,4,8,10-tetraoxa-3,9-diphosphaspiro [5.5]undecane, 3,9-dibenzyl-3,9-dioxide (FR-2)

22.55 g (0.055 mole) of 3,9-dibenzyloxy-2,4,8,10-tetraoxa-3,9-diphosphaspiro[5.5]undecane, 19.01 g (0.11 mole) of benzyl bromide and 33.54 g (0.32 mole) of xylene were charged into a reactor equipped with a stirrer, thermometer and condenser, and dry nitrogen was let flow into the reactor under agitation at room temperature. Then, heating was started with an oil bath, and the reaction mixture was heated and stirred at a reflux temperature (about 130° C.) for 4 hours. After heating, the reaction product was left to be cooled to room temperature, and 20 ml of xylene was added and further stirred for 30 minutes. The precipitated crystal was separated by filtration and washed with 20 ml of xylene twice. The obtained roughly purified product and 40 ml of methanol were put into a reactor equipped with a condenser and stirrer and refluxed for about 2 hours. After cooling to room temperature, the crystal was separated by filtration and washed with 20 ml of methanol, and the obtained filtrate was dried at 120° C. and $1.33 \times 10^2$ Pa for 19 hours to obtain a white flaky crystal. It was confirmed by the mass spectral analysis, $^1$H and $^{31}$P nuclear magnetic resonance spectral analysis and elemental analysis that the product was bisbenzylpentaerythritol diphosphonate. The yield was 20.60 g, the yield rate was 91%, and the $^{31}$P-NMR purity was 99%. The HPLC purity measured by the method of this text was 99%. The acid value was 0.05 mgKOH/g.

$^1$H-NMR (DMSO-$d_6$, 300 MHz): δ7.2-7.4 (m, 10H), 4.1-4.5 (m, 8H), 3.5 (d, 4H), $^{31}$P-NMR (DMSO-$d_6$, 120 MHz): δ23.1 (S), melting point: 257° C.

Preparation Example 3

Preparation of 2,4,8,10-tetraoxa-3,9-diphosphaspiro [5.5]undecane, 3,9-diα-methylbenzyl-3,9-dioxide (FR-3)

816.9 g (6.0 moles) of pentaerythritol, 19.0 g (0.24 mole) of pyridine and 2,250.4 g (24.4 moles) of toluene were fed to a reactor equipped with a thermometer, condenser and dropping funnel and stirred. 1,651.8 g (12.0 moles) of phosphorus trichloride was added to the reactor by using the dropping funnel and then heated and stirred at 60° C. after addition. After a reaction, the reactor was cooled to room temperature, 5,180.7 g (61.0 moles) of methylene chloride was added to the obtained reaction product, and 889.4 g (12.0 moles) of tertiary butanol and 150.2 g (1.77 moles) of methylene chloride were added dropwise under cooling with ice. The obtained crystal was washed with toluene and methylene chloride and filtered. The obtained filtrate was dried at 80° C. and $1.33 \times 10^2$ Pa for 12 hours to obtain 1,341.1 g (5.88 moles) of a white solid. It was confirmed by $^{31}$P and $^1$HNMR spectra that the obtained solid was 2,4,8,10-tetraoxa-3,9-diphosphaspiro[5.5]undecane, 3,9-dihydro-3,9-dioxide.

1,341.0 g (5.88 moles) of the obtained 2,4,8,10-tetraoxa-3,9-diphosphaspiro[5.5]undecane, 3,9-dihydro-3,9-dioxide and 6,534.2 g (89.39 moles) of DMF were fed to a reactor equipped with a thermometer, condenser and dropping funnel and stirred. 648.7 g (12.01 moles) of sodium methoxide was added to the reactor under cooling with ice. After 2 hours of stirring under cooling with ice, they were stirred at room temperature for 5 hours. Further, after DMF was distilled off, 2,613.7 g (35.76 moles) of DMF was added, and 2,204.06 g (11.91 moles) of 1-phenylethyl bromide was added dropwise to the reaction mixture under cooling with ice. After 3 hours of stirring under cooling with ice, DMF was distilled off, 8 liters of water was added, and the precipitated solid was separated by filtration and washed with 2 liters of water twice. The obtained roughly purified product and 4 liters of methanol were put into a reactor equipped with a condenser and stirrer and refluxed for about 2 hours. After the reactor was cooled to room temperature, the crystal was separated by filtration and washed with 2 liters of methanol, and the obtained filtrate was dried at 120° C. and $1.33 \times 10^2$ Pa for 19 hours to obtain 1,845.9 g (4.23 moles) of a white flaky crystal. It was confirmed by $^{31}$P-NMR and $^1$H-NMR spectra and elemental analysis that the obtained solid was 2,4,8,10-tetraoxa-3,9-diphosphaspiro[5.5]undecane, 3,9-diα-methylbenzyl-3,9-dioxide. The $^{31}$PNMR purity was 99%. The HPLC purity measured by the method of this text was 99%. The acid value was 0.03 mgKOH/g.

$^1$H-NMR (CDCl$_3$, 300 MHz): δ7.2-7.4 (m, 10H), 4.0-4.2 (m, 4H), 3.4-3.8 (m, 4H), 3.3 (qd, 4H), 1.6 (ddd, 6H), $^{31}$P-NMR (CDCl$_3$, 120 MHz): δ28.7 (S), melting point: 190-210° C., elemental analysis calculated values: C, 57.80; H, 6.01, measurement values: C, 57.83; H, 5.96

Preparation Example 4

Preparation of 2,4,8,10-tetraoxa-3,9-diphosphaspiro [5.5]undecane, 3,9-di(2-phenylethyl)-3,9-dioxide (FR-4)

816.9 g (6.0 moles) of pentaerythritol, 19.0 g (0.24 mole) of pyridine and 2,250.4 g (24.4 moles) of toluene were fed to a reactor equipped with a thermometer, condenser and dropping funnel and stirred. 1,651.8 g (12.0 moles) of phosphorus trichloride was added to the reactor by using the dropping funnel and then heated and stirred at 60° C. after addition. After a reaction, the reactor was cooled to room temperature, 5,180.7 g (61.0 moles) of methylene chloride was added to the obtained reaction product, and 889.4 g (12.0 moles) of tertiary butanol and 150.2 g (1.77 moles) of methylene chloride were added dropwise under cooling with ice. The obtained crystal was washed with toluene and methylene chloride and filtered. The obtained filtrate was dried at 80° C. and $1.33 \times 10^2$ Pa for 12 hours to obtain 1,341.1 g (5.88 moles) of a white solid. It was confirmed by $^{31}$P and $^1$H-NMR spectra that the obtained solid was 2,4,8,10-tetraoxa-3,9-diphosphaspiro[5.5]undecane, 3,9-dihydro-3,9-dioxide.

1,341.0 g (5.88 moles) of the obtained 2,4,8,10-tetraoxa-3,9-diphosphaspiro[5.5]undecane, 3,9-dihydro-3,9-dioxide and 6,534.2 g (89.39 moles) of DMF were fed to a reactor equipped with a thermometer, condenser and dropping funnel and stirred. 648.7 g (12.01 moles) of sodium methoxide was added to the reactor under cooling with ice. After 2 hours of stirring under cooling with ice, they were stirred at room temperature for 5 hours. After DMF was distilled off, 2,613.7 g (35.76 moles) of DMF was added, and 2,183.8 g (11.8 moles) of (2-bromoethyl)benzene was added dropwise to the reaction mixture under cooling with ice. After 3 hours of stirring under cooling with ice, DMF was distilled off, 8 liters of water was added, and the precipitated solid was separated by filtration and washed with 2 liters of water twice. The obtained roughly purified product and 4 liters of methanol were put into a reactor equipped with a condenser and stirrer and refluxed for about 2 hours. After the reactor was cooled to room temperature, the crystal was separated by filtration and washed with 2 liters of methanol, and the obtained filtrate was dried at 120° C. and $1.33 \times 10^2$ Pa for 19 hours to obtain 1,924.4 g (4.41 moles) of a white powder. It was confirmed by $^{31}$P-NMR and $^1$H-NMR spectra and elemental analysis that the obtained solid was 2,4,8,10-tetraoxa-3,9-diphosphaspiro[5.5]undecane, 3,9-di(2-phenylethyl)-3,9-dioxide. The $^{31}$P-NMR purity was 99%. The HPLC purity measured by the method of this text was 99%. The acid value was 0.03 mgKOH/g.

$^1$H-NMR (CDCl$_3$, 300 MHz): δ7.1-7.4 (m, 10H), 3.85-4.65 (m, 8H), 2.90-3.05 (m, 4H), 2.1-2.3 (m, 4H), $^{31}$P-NMR (CDCl$_3$, 120 MHz): δ31.5 (S), melting point: 245-246° C., elemental analysis calculated values: C, 57.80; H, 6.01, measurement values: C, 58.00; H, 6.07

Preparation Example 5

Preparation of 2,4,8,10-tetraoxa-3,9-diphosphaspiro[5.5]undecane, 3,9-di(2-phenylethyl)-3,9-dioxide (FR-5)

436.4 g (1.0 mole) of 3,9-di(2-phenylethoxy)-2,4,8,10-tetraoxa-3,9-diphosphaspiro[5.5]undecane and 370.1 g (2.0 moles) of 2-phenylethyl bromide were charged into a reactor equipped with a stirrer, thermometer and condenser, and dry nitrogen was let flow into the reactor under agitation at room temperature. Then, heating was started with an oil bath, and the reactor was kept at an oil bath temperature of 180° C. for 10 hours. The oil bath was then removed to cool the reactor to room temperature. After 2,000 ml of methanol was added to the obtained white solid reaction product and stirred to wash the product, a white powder was separated by filtration with a glass filter. The obtained white powder and 4,000 ml of methanol were put into a reactor equipped with a condenser and stirrer and refluxed for about 2 hours. After cooling to room temperature, the crystal was separated by filtration and washed with 2,000 ml of methanol. The obtained white powder was dried at 100 Pa and 120° C. for 8 hours to obtain 362.3 g of 2,4,8,10-tetraoxa-3,9-diphosphaspiro[5.5]undecane, 3,9-di(2-phenylethyl)-3,9-dioxide. It was confirmed by mass spectral analysis, $^1$H and $^{31}$P nuclear magnetic resonance spectral analysis and elemental analysis that the product was bis-2,4,8,10-tetraoxa-3,9-diphosphaspiro[5.5]undecane, 3,9-di(2-phenylethyl)-3,9-dioxide. The yield rate was 83%, the HPLC purity was 99.3%, and the acid value was 0.41 mgKOH/g.

$^1$H-NMR (CDCl$_3$, 300 MHz): δ7.1-7.4 (m, 10H), 3.85-4.65 (m, 8H), 2.90-3.05 (m, 4H), 2.1-2.3 (m, 4H), $^{31}$P-NMR (CDCl$_3$, 120 MHz): δ31.5 (S), melting point: 245-246° C.

Preparation Example 6

Preparation of 2,4,8,10-tetraoxa-3,9-diphosphaspiro[5.5]undecane, 3,9-bis(diphenylmethyl)-3,9-dioxide (FR-6)

2,058.5 g (7.22 moles) of diphenylmethyl phosphonic acid dichloride, 468.3 g (3.44 moles) of pentaerythritol, 1,169.4 g (14.8 moles) of pyridine and 8,200 g of chloroform were fed to a 10-liter three-necked flask equipped with a stirrer, agitation blade, reflux condenser and thermometer, heated at 60° C. in a nitrogen gas stream and stirred for 6 hours. After the end of a reaction, chloroform was substituted by methylene chloride, and 6 liters of distilled water was added to the reaction mixture and stirred to precipitate a white powder. The white powder was separated by suction filtration, and the obtained white product was washed with methanol and dried at 100° C. and $1.33 \times 10^2$ Pa for 10 hours to obtain 1,156.2 g of a white solid. It was confirmed by $^{31}$P-NMR and $^1$H-NMR spectra and elemental analysis that the obtained solid was 2,4,8,10-tetraoxa-3,9-diphosphaspiro[5.5]undecane, 3,9-bis(diphenylmethyl)-3,9-dioxide. The $^{31}$P-NMR purity was 99%. The HPLC purity measured by the method of this text was 99%. The acid value was 0.3 mgKOH/g.

$^1$H-NMR (DMSO-d$_6$, 300 MHz): δ7.20-7.60 (m, 20H), 5.25 (d, 2H), 4.15-4.55 (m, 8H), $^{31}$P-NMR (DMSO-d$_6$, 120 MHz): δ20.9, melting point: 265° C., elemental analysis calculated values: C, 66.43; H, 5.39, measurement values: C, 66.14; H, 5.41

Preparation Example 7

Preparation of 2,4,8,10-tetraoxa-3,9-diphosphaspiro[5.5]undecane, 3,9-bis(diphenylmethyl)-3,9-dioxide (FR-7)

A stirrer, a thermometer and a condenser were attached to a three-necked flask, and 40.4 g (0.072 mole) of 3,9-bis(diphenylmethoxy)-2,4,8,10-tetraoxa-3,9-diphosphaspiro[5.5]undecane, 35.5 g (0.14 mole) of diphenylmethyl bromide and 48.0 g (0.45 mole) of xylene were fed to this three-necked flask in a nitrogen gas stream, heated and stirred at a reflux temperature (about 130° C.) for 3 hours. After the end of heating, the flask was left to be cooled to room temperature, and 30 ml of xylene was added and further stirred for 30 minutes. The precipitated crystal was separated by filtration and washed with 30 ml of xylene twice. The obtained roughly purified product and 100 ml of methanol were put into an eggplant-like flask, and a condenser was attached to the flask to carry out reflux for about 1 hour. After the flask was cooled to room temperature, the crystal was separated by filtration, washed with 50 ml of methanol twice and dried at 120° C. under reduced pressure. It was confirmed by $^{31}$P-NMR and $^1$H-NMR spectra and elemental analysis that the obtained solid was 2,4,8,10-tetraoxa-3,9-diphosphaspiro[5.5]undecane, 3,9-bis(diphenylmethyl)-3,9-dioxide. The obtained solid was a white powder, the yield was 36.8 g, and the yield rate was 91%. The $^{31}$P-NMR purity was 99%. The HPLC purity measured by the method of this text was 99%. The acid value was 0.07 mgKOH/g.

$^1$H-NMR (DMSO-d$_6$, 300 MHz): δ7.2-7.6 (m, 20H), 6.23 (d, J=9 Hz, 2H), 3.89-4.36 (m, 6H), 3.38-3.46 (m, 2H), $^{31}$P-NMR (CDCl$_3$, 120 MHz): δ20.9 (S), melting point: 265° C., elemental analysis calculated values: C, 66.43; H, 5.39, measurement values: C, 66.14; H, 5.41

Preparation Example 8

Preparation of Polycarbonate (PC-1)

7,307 parts by weight (50 moles) of isosorbide and 10,709 parts by weight (50 moles) of diphenyl carbonate were fed to a reactor, and 4.8 parts by weight ($1 \times 10^{-4}$ mol based on 1 mole of the diphenyl carbonate component) of tetramethylammonium hydroxide and $5.0 \times 10^{-3}$ part by weight ($0.25 \times 10^{-6}$ mole based on 1 mole of the diphenyl carbonate component) of sodium hydroxide as polymerization catalysts were fed to the reactor and dissolved by heating at 180° C. and normal pressure in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased up to 260° C. to carry out the reaction at 260° C. and $6.66 \times 10^{-5}$ MPa for 1 hour in the end. The polymer after the reaction was pelletized to obtain a pellet having a specific viscosity of 0.33. This pellet had a glass transition temperature of 165° C. and a 5% weight loss temperature of 355° C.

Preparation Example 9

Preparation of Polycarbonate (PC-2)

A pellet having a specific viscosity of 0.23 was obtained in the same manner as in Preparation Example 8 except that a reaction was carried out at 255° C. and $6.66 \times 10^{-5}$ MPa for 30 minutes in the end. This pellet had a glass transition temperature of 158° C. and a 5% weight loss temperature of 353° C.

Preparation Example 10

Preparation of Polycarbonate (PC-3)

A pellet having a specific viscosity of 0.28 was obtained in the same manner as in Preparation Example 8 except that 6,722 parts by weight (46 moles) of isosorbide, 10,709 parts by weight (50 moles) of diphenyl carbonate and 304 parts by weight (4 moles) of 1,3-propanediol were used. This pellet had a glass transition temperature of 146° C. and a 5% weight loss temperature of 342° C.

Components used in Examples and Comparative Examples are given below.
(I) Polycarbonate resin (component A)
(i) polycarbonate synthesized in Preparation Example 8 (to be referred to as "PC-1" hereinafter)
(ii) polycarbonate synthesized in Preparation Example 9 (to be referred to as "PC-2" hereinafter)
(iii) polycarbonate synthesized in Preparation Example 10 (to be referred to as "PC-3" hereinafter)
(II) organic phosphorus compound (component B)
(i) 2,4,8,10-tetraoxa-3,9-diphosphaspiro[5.5]undecane, 3,9-dibenzyl-3,9-dioxide synthesized in Preparation Example 1 {phosphorus-based compound represented by the formula (1-a) (to be referred to as "FR-1" hereinafter)}
(ii) 2,4,8,10-tetraoxa-3,9-diphosphaspiro[5.5]undecane,3,9-dibenzyl-3,9-dioxide synthesized in Preparation Example 2 {phosphorus-based compound represented by the formula (1-a) (to be referred to as "FR-2" hereinafter)}
(iii) 2,4,8,10-tetraoxa-3,9-diphosphaspiro[5.5]undecane, 3,9-diα-methylbenzyl-3,9-dioxide synthesized in Preparation Example 3 {phosphorus-based compound represented by the formula (1-b) (to be referred to as "FR-3" hereinafter)}
(iv) 2,4,8,10-tetraoxa-3,9-diphosphaspiro[5.5]undecane, 3,9-di(2-phenylethyl)-3,9-dioxide synthesized in Preparation Example 4 {phosphorus-based compound represented by the formula (1-c) (to be referred to as "FR-4" hereinafter)}
(v) 2,4,8,10-tetraoxa-3,9-diphosphaspiro[5.5]undecane, 3,9-di(2-phenylethyl)-3,9-dioxide synthesized in Preparation Example 5 {phosphorus-based compound represented by the formula (1-c) (to be referred to as "FR-5" hereinafter)}
(vi) 2,4,8,10-tetraoxa-3,9-diphosphaspiro[5.5]undecane, 3,9-bis(diphenylmethyl)-3,9-dioxide synthesized in Preparation Example 6 {phosphorus-based compound represented by the formula (1-d) (to be referred to as "FR-6" hereinafter)}
(vii) 2,4,8,10-tetraoxa-3,9-diphosphaspiro[5.5]undecane, 3,9-bis(diphenylmethyl)-3,9-dioxide synthesized in Preparation Example 7 {phosphorus-based compound represented by the formula (1-d) (to be referred to as "FR-7" hereinafter)}
(III) other organic phosphorus compounds
(i) triphenyl phosphate (TPP of Daihachi Chemical Industry Co., Ltd.) (to be referred to as "TPP" hereinafter)
(ii) 1,3-phenylenebis[di(2,6-dimethylphenyl)phosphate] (PX-200 of Daihachi Chemical Industry Co., Ltd.) (to be referred to as "PX-200" hereinafter)

Examples 1 to 22 and Comparative Examples 1 to 9

The amounts (parts by weight) shown in Tables 1 to 3 of components shown in Tables 1 to 3 were mixed together by means of a tumbler, and the resulting mixture was pelletized by means of a 15 mm-diameter double-screw extruder (KZW15 of Technobell Co., Ltd.). The obtained pellet was dried with a hot air drier at 130° C. for 4 hours. The dried pellet was molded by means of an injection molding machine (J75EIII of The Japan Steel Works, Ltd.). The evaluation results of the molded plate are shown in Tables 1 to 3.

TABLE 1

| | Component | Unit | Ex. 1 | Ex. 2 | Ex. 3 | Ex. 4 | Ex. 5 | Ex. 6 | Ex. 7 |
|---|---|---|---|---|---|---|---|---|---|
| Composition | Component A | Type | PC-1 | PC-1 | PC-1 | PC-1 | PC-1 | PC-1 | PC-1 |
| | | Parts by weight | 100 | 100 | 100 | 100 | 100 | 100 | 100 |
| | Component B | Type | FR-1 | FR-2 | FR-3 | FR-4 | FR-5 | FR-6 | FR-7 |
| | | Parts by weight | 5 | 5 | 5 | 5 | 5 | 5 | 5 |

TABLE 1-continued

| | | | | | | | | | |
|---|---|---|---|---|---|---|---|---|---|
| Flame retardancy | UL-94 test | Thickness of test sample | 1.6 mm | 1.6 mm | 1.6 mm | 1.6 mm | 1.6 mm | 1.6 mm | 1.6 mm |
| | | UL rating | V-2 | V-2 | V-2 | V-2 | V-2 | V-2 | V-2 |

| | Component | | Unit | Ex. 8 | Ex. 9 | Ex. 10 | Ex. 11 | Ex. 12 | Ex. 13 |
|---|---|---|---|---|---|---|---|---|---|
| Composition | Component A | Type | | PC-2 | PC-2 | PC-2 | PC-2 | PC-2 | PC-2 |
| | | Parts by weight | | 100 | 100 | 100 | 100 | 100 | 100 |
| | Component B | Type | | FR-1 | FR-2 | FR-3 | FR-4 | FR-5 | FR-6 |
| | | Parts by weight | | 5 | 5 | 5 | 5 | 5 | 5 |
| Flame retardancy | UL-94 test | Thickness of test sample | | 1.6 mm | 1.6 mm | 1.6 mm | 1.6 mm | 1.6 mm | 1.6 mm |
| | | UL rating | | V-2 | V-2 | V-2 | V-2 | V-2 | V-2 |

Ex.: Example

TABLE 2

| | Component | Unit | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| Composition | Component A Type | | PC-2 | PC-3 | PC-3 | PC-3 | PC-3 | PC-3 | PC-3 | PC-3 | PC-1 |
| | Parts by weight | | 100 | 100 | 100 | 100 | 100 | 100 | 100 | 100 | 100 |
| | Component B Type | | FR-7 | FR-1 | FR-2 | FR-3 | FR-4 | FR-5 | FR-7 | FR-6 | FR-1 |
| | Parts by weight | | 5 | 5 | 5 | 5 | 5 | 5 | 5 | 5 | 25 |
| Flame retardancy | UL-94 test Thickness of test sample | | 1.6 mm | 1.6 mm | 1.6 mm | 1.6 mm | 1.6 mm | 1.6 mm | 1.6 mm | 1.6 mm | 1.6 mm |
| | UL rating | | V-2 | V-2 | V-2 | V-2 | V-2 | V-2 | V-2 | V-2 | V-0 |

Ex.: Example

TABLE 3

| | Component | Unit | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 |
|---|---|---|---|---|---|---|---|---|---|---|---|
| Composition | Component A Type | | PC-1 | PC-2 | PC-3 | PC-1 | PC-1 | PC-2 | PC-2 | PC-3 | PC-3 |
| | Parts by weight | | 100 | 100 | 100 | 100 | 100 | 100 | 100 | 100 | 100 |
| | Phosphorus component Type | | — | — | — | TPP | PX-200 | TPP | PX-200 | TPP | PX-200 |
| | Parts by weight | | — | — | — | 5 | 5 | 5 | 5 | 5 | 5 |
| Flame retardancy | UL-94 test Thickness of test sample | | 1.6 mm | 1.6 mm | 1.6 mm | 1.6 mm | 1.6 mm | 1.6 mm | 1.6 mm | 1.6 mm | 1.6 mm |
| | UL rating | | not V | not V | not V | not V | not V | not V | not V | not V | not V |

C. Ex.: Comparative Example

Effect of the Invention

The flame retardant resin composition of the present invention and a molded article formed therefrom have the following advantages over conventional resin compositions obtained from plant-derived raw materials.
(i) The flame retardant resin composition and the molded article have high flame retardancy without using a halogen-containing flame retardant substantially.
(ii) Since the organic phosphorus compound as a flame retardant has an excellent flame retarding effect for a resin obtained from a plant-derived raw material, V-2 rating is achieved even with a relatively small amount thereof.
(iii) Since a resin obtained from a plant-derived raw material rarely thermally deteriorates at the time of molding it or using a molded article thereof due to the structure and characteristic properties of the organic phosphorus compound used as a flame retardant, the resin has excellent heat stability. Therefore, the flame retardant resin composition of the present invention has excellent flame retardancy, mechanical strength and heat stability all of which are well balanced.
(iv) Since the organic phosphorus compound as a flame retardant is achromatic and compatible with a resin obtained from a plant-derived raw material, a molded article having excellent transparency can be obtained.

INDUSTRIAL APPLICABILITY

Since the flame retardant resin composition of the present invention contains substantially no halogen and has extremely high flame retardancy, it is useful as a material for forming various molded articles such as home electric appliance parts, electric and electronic parts, auto parts, mechanical and electromechanical parts, and cosmetic containers.

The invention claimed is:

1. A flame retardant resin composition comprising:
   100 parts by weight of a resin component (component A) which contains at least 50 wt % of a polycarbonate (component A-1) having a unit represented by the following formula (A-1); and
   1 to 100 parts by weight of an organic phosphorus compound (component B) represented by the following formula (1):

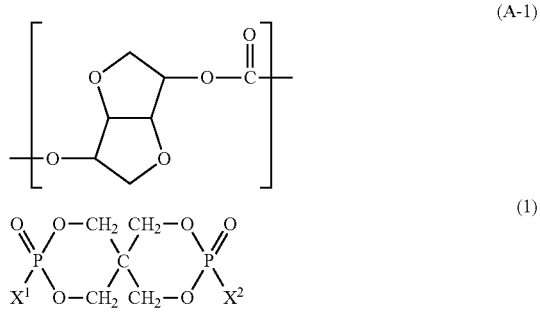

(in the above formula, $X^1$ and $X^2$ are each independently an aromatic substituted alkyl group represented by the following formula (2):

(in the above formula, AL is a branched or linear aliphatic hydrocarbon group having 1 to 5 carbon atoms, Ar is a phenyl group, naphthyl group or anthryl group, all of which may have a substituent, and may be bonded to any carbon atom contained in AL, and n is an integer of 1 to 3)).

2. The resin composition according to claim 1, wherein the polycarbonate (component A-1) has a glass transition temperature (Tg) of 100 to 165° C. and a 5% weight loss temperature (Td) of 300 to 400° C.

3. The resin composition according to claim 1, wherein the unit represented by the formula (A-1) is a unit derived from isosorbide (1,4:3,6-dianhydro-D-sorbitol).

4. The resin composition according to claim 1, wherein the organic phosphorus compound (component B) is at least one selected from the group consisting of organic phosphorus compounds represented by the following formulas (3) and (4):

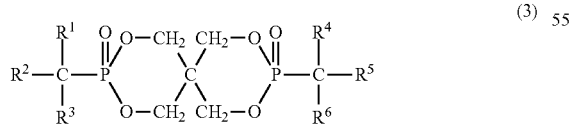

(in the above formula, $R^2$ and $R^5$ are each independently a phenyl group, naphthyl group or anthryl group, all of which may have a substituent, and $R^1$, $R^3$, $R^4$ and $R^6$ are each independently a hydrogen atom, branched or linear alkyl group having 1 to 4 carbon atoms, phenyl group which may have a substituent, naphthyl group which may have a substituent or anthryl group which may have a substituent.)

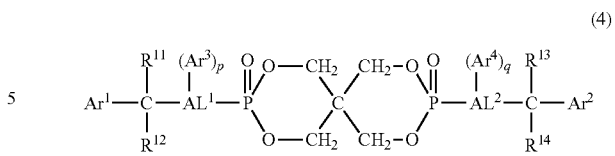

(In the above formula, $Ar^1$ and $Ar^2$ are each independently a phenyl group, naphthyl group or anthryl group, all of which may have a substituent, $R^{11}$, $R^{12}$, $R^{13}$ and $R^{14}$ are each independently a hydrogen atom, aliphatic hydrocarbon group having 1 to 3 carbon atoms, phenyl group which may have a substituent, naphthyl group which may have a substituent or anthryl group which may have a substituent, $AL^1$ and $AL^2$ are each independently a branched or linear aliphatic hydrocarbon group having 1 to 4 carbon atoms, $Ar^3$ and $Ar^4$ are each independently a phenyl group, naphthyl group or anthryl group, all of which may have a substituent, p and q are each independently an integer of 0 to 3, and $Ar^3$ and $Ar^4$ may be bonded to any carbon atoms of $AL^1$ and $AL^2$, respectively.)

5. The resin composition according to claim 1, wherein the organic phosphorus compound (component B) is represented by the following formula (5):

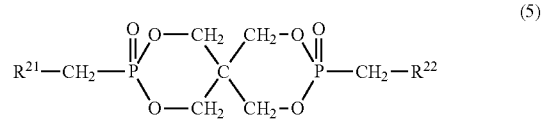

(in the above formula, $R^{21}$ and $R^{22}$ are each independently a phenyl group, naphthyl group or anthryl group, all of which may have a substituent.)

6. The resin composition according to claim 1, wherein the organic phosphorus compound (component B) is a compound represented by the following formula (1-a):

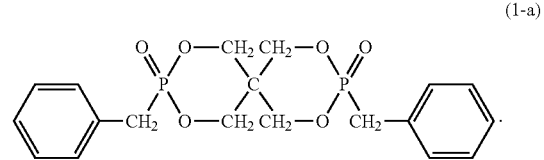 [SMILES: O=P1(Cc2ccccc2)OCC2(CO1)COP(=O)(Cc1ccccc1)OC2 ; "."]

7. The resin composition according to claim 1, wherein the organic phosphorus compound (component B) is represented by the following formula (6):

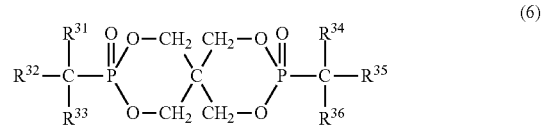

(in the above formula, $R^{31}$ and $R^{34}$ are each independently a hydrogen atom or aliphatic hydrocarbon group having 1 to 4 carbon atoms, $R^{33}$ and $R^{36}$ are each independently an aliphatic hydrocarbon group having 1 to 4 carbon atoms, and $R^{32}$ and $R^{35}$ are each independently a phenyl group, naphthyl group or anthryl group, all of which may have a substituent).

8. The resin composition according to claim 1, wherein the organic phosphorus compound (component B) is a compound represented by the following formula (1-b):

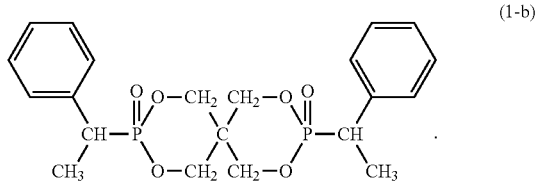 [SMILES: CC(c1ccccc1)P1(=O)OCC2(CO1)COP(=O)(C(C)c1ccccc1)OC2]
(1-b)

9. The resin composition according to claim 1, wherein the organic phosphorus compound (component B) is represented by the following formula (7):

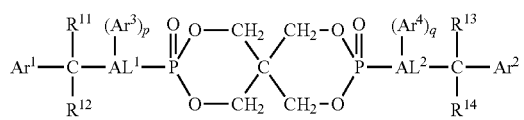
(7)

(in the above formula, $Ar^1$ and $Ar^2$ are each independently a phenyl group, naphthyl group or anthryl group, all of which may have a substituent, $R^{11}$, $R^{12}$, $R^{13}$ and $R^{14}$ are each independently a hydrogen atom, aliphatic hydrocarbon group having 1 to 3 carbon atoms, phenyl group which may have a substituent, naphthyl group which may have a substituent or anthryl group which may have a substituent, $AL^1$ and $AL^2$ are each independently a branched or linear aliphatic hydrocarbon group having 1 to 4 carbon atoms, $Ar^3$ and $Ar^4$ are each independently a phenyl group, naphthyl group or anthryl group, all of which may have a substituent, p and q are each independently an integer of 0 to 3, and $Ar^3$ and $Ar^4$ may be bonded to any carbon atoms of $AL^1$ and $AL^2$, respectively).

10. The resin composition according to claim 1, wherein the organic phosphorus compound (component B) is a compound represented by the following formula (1-c):

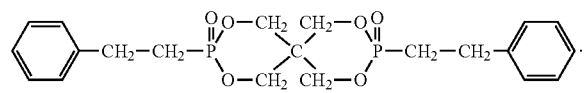
(1-c)

11. The resin composition according to claim 1, wherein the organic phosphorus compound (component B) is represented by the following formula (8):

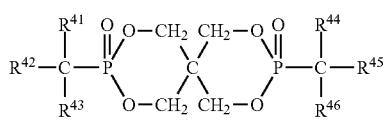
(8)

(in the above formula, $R^{41}$ and $R^{44}$ are each independently a hydrogen atom, aliphatic hydrocarbon group having 1 to 4 carbon atoms, phenyl group which may have a substituent, naphthyl group which may have a substituent or anthryl group which may have a substituent, and $R^{42}$, $R^{43}$, $R^{45}$ and $R^{46}$ are each independently a phenyl group, naphthyl group or anthryl group, all of which may have a substituent).

12. The resin composition according to claim 1, wherein the organic phosphorus compound (component B) is a compound represented by the following formula (1-d):

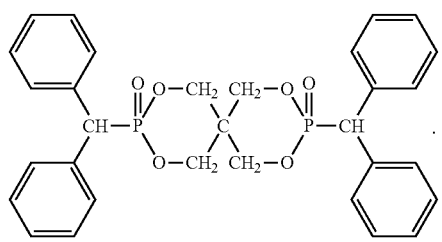
(1-d)

13. The resin composition according to claim 1, wherein the acid value of the organic phosphorus compound (component B) is 0.7 mgKOH/g or less.

14. The resin composition according to claim 1 which can attain at least UL-94 V-2 flame retardancy.

15. The resin composition according to claim 1 which comprises the component B in an amount of 2 to 70 parts by weight based on 100 parts by weight of the component A.

16. A molded article formed from the resin composition of claim 1.

* * * * *